United States Patent [19]

Harwick

[11] 4,264,004
[45] Apr. 28, 1981

[54] CONTROL SYSTEM FOR ACCUMULATING CONVEYOR

[75] Inventor: Warren J. Harwick, Milwaukee, Wis.

[73] Assignee: Air Logic Power Systems, Inc., Milwaukee, Wis.

[21] Appl. No.: 944,131

[22] Filed: Sep. 20, 1978

[51] Int. Cl.³ ............................................. B65G 13/07
[52] U.S. Cl. .................................................. 198/781
[58] Field of Search ....................... 198/781, 789, 460

[56] References Cited

U.S. PATENT DOCUMENTS

| 698,483 | 4/1902 | Faith et al. | 137/112 |
|---|---|---|---|
| 3,612,247 | 10/1971 | Pipp | 198/781 |
| 3,768,630 | 10/1973 | Inwood et al. | 198/781 |
| 4,109,783 | 8/1978 | Vogt | 198/781 |

OTHER PUBLICATIONS

Telemecanique Technical Handbook-p. 46.

Primary Examiner—Jeffrey V. Nase
Attorney, Agent, or Firm—Harness, Dickey & Pierce

[57] ABSTRACT

A control system for an accumulating conveyor having a plurality of zones, wherein each zone includes an improved pneumatic logic module comprising a relay limit valve and an AND valve, the output of the AND valve being connected to a driving input of a fluid motor for transmitting power to the corresponding zone of the conveyor. A pilot operated relay valve is connected to the first zone and employed to release an item thereon. The control system can be easily modified to provide forward or reverse accumulation, and single or train release. Additional pilot operated relay valves are employed for selecting between forward and reverse accumulation and single additional pilot and train release modes.

9 Claims, 13 Drawing Figures

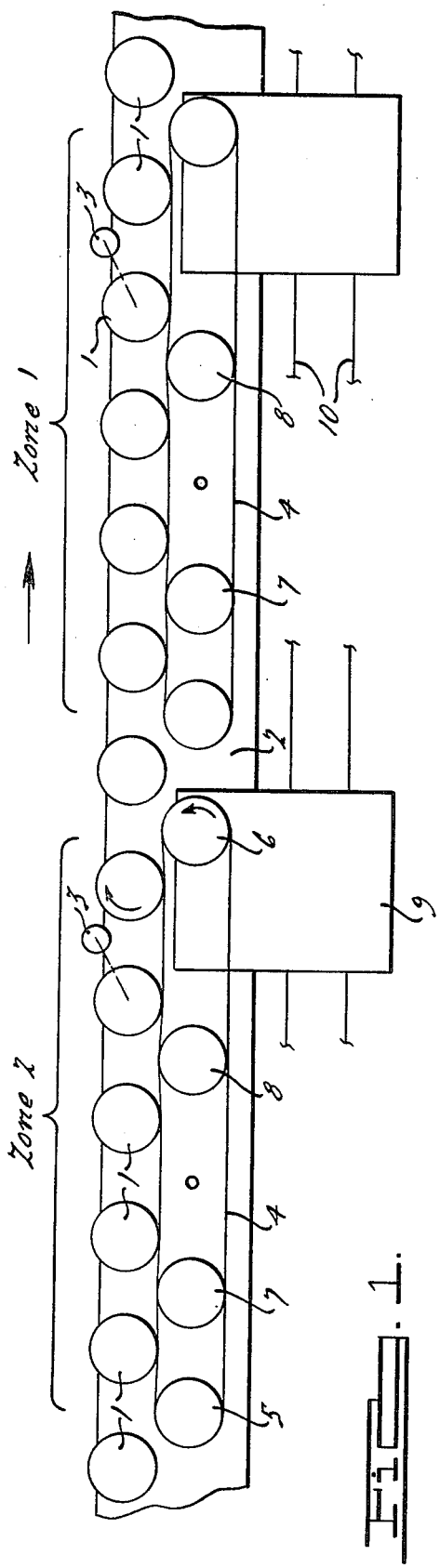
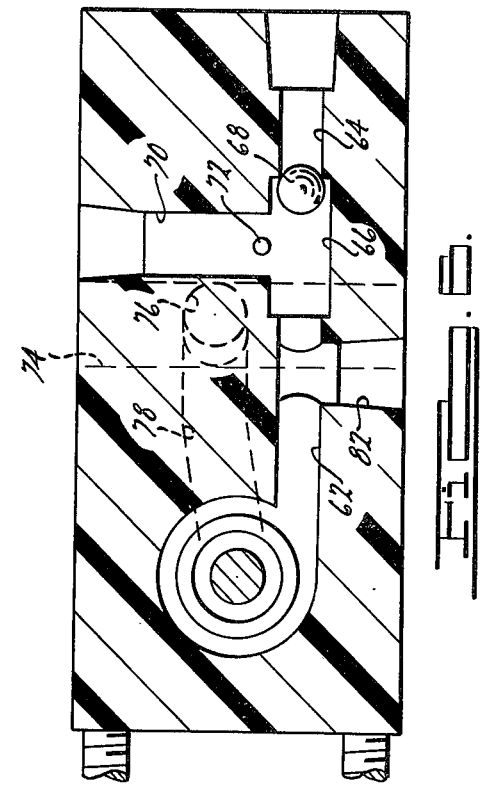

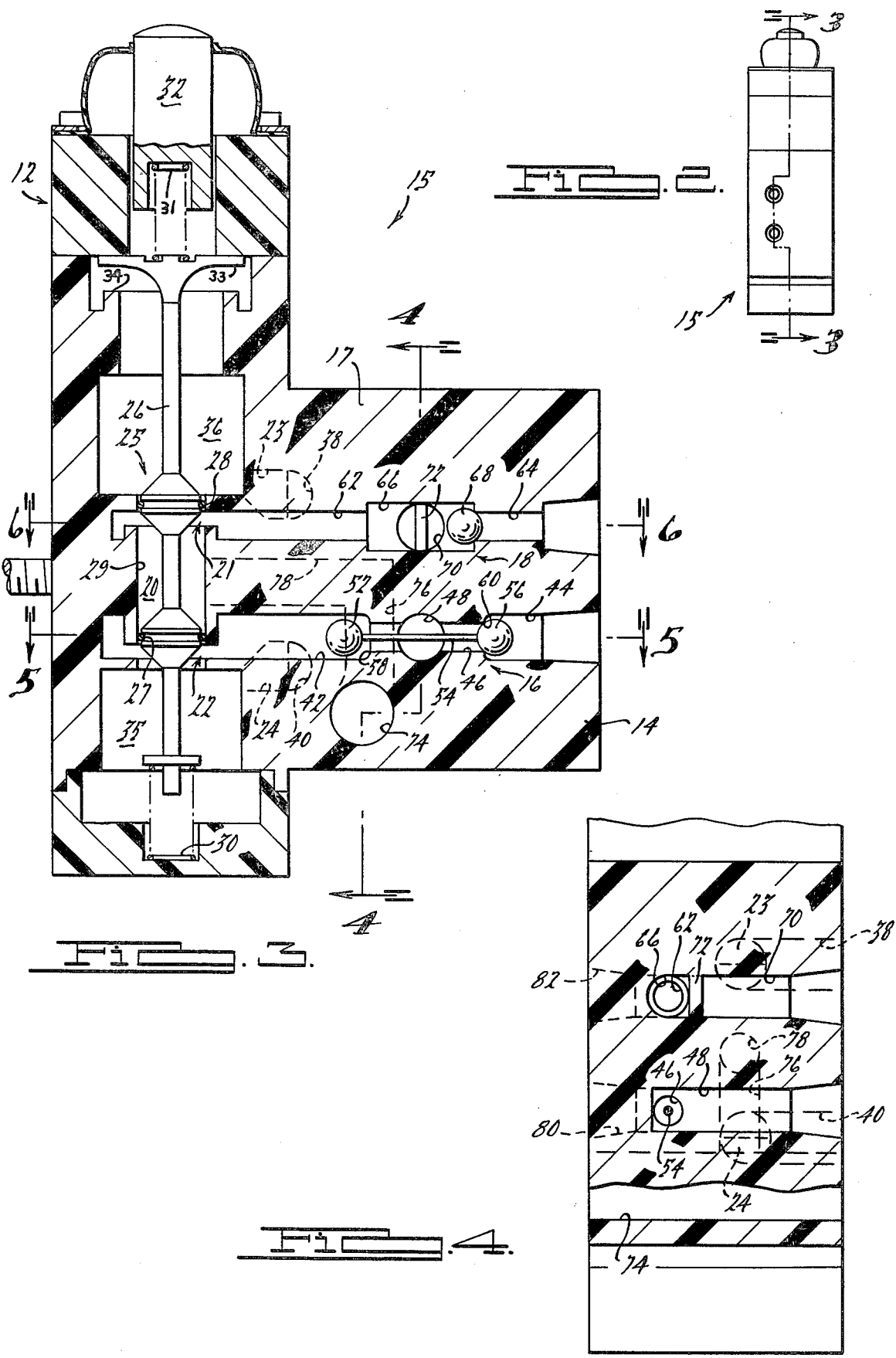

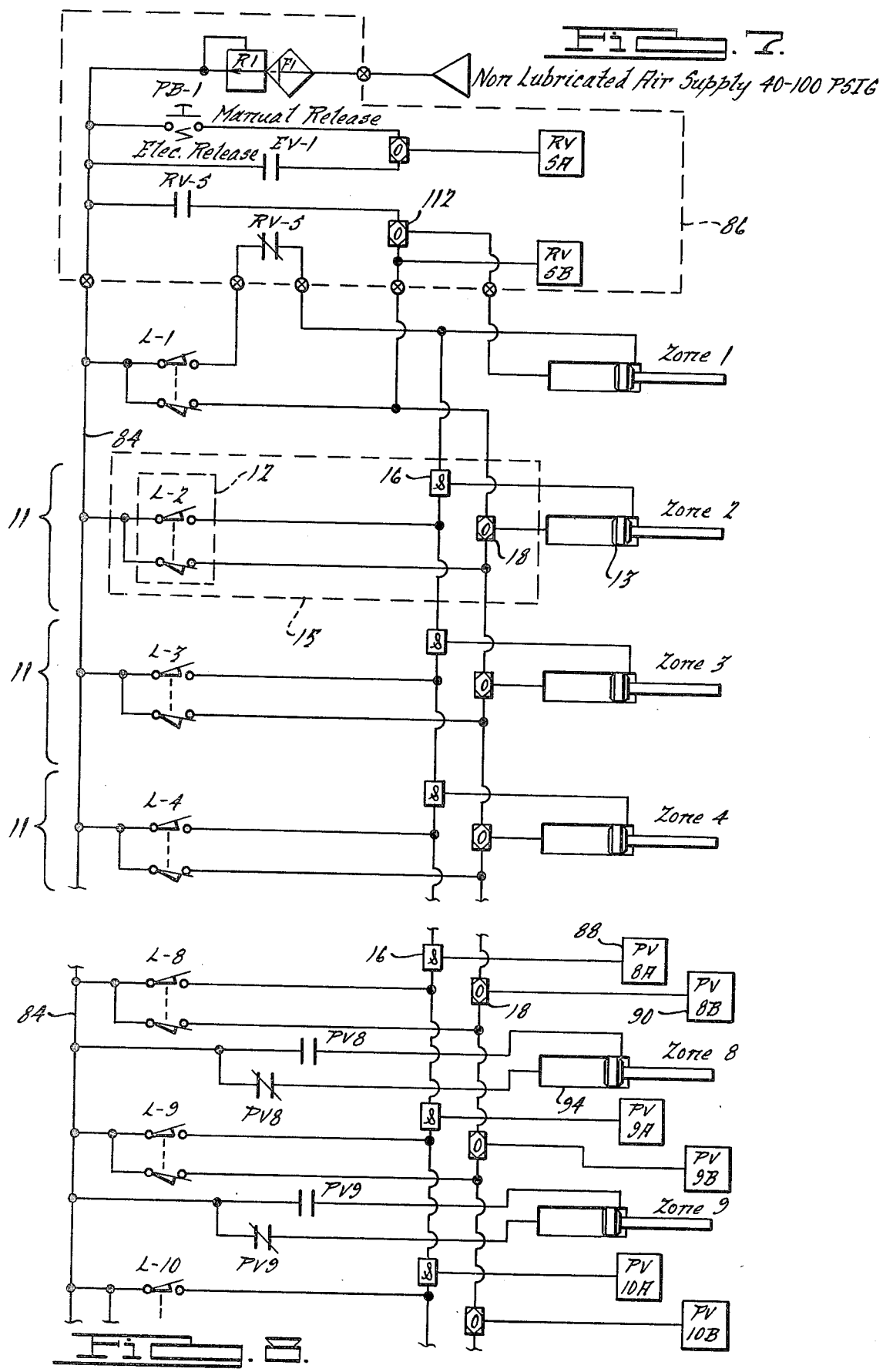

CONTROL SYSTEM FOR ACCUMULATING CONVEYOR

BACKGROUND OF THE INVENTION

This invention relates to a control system for an accumulating conveyor having zero pressure accumulation. More particularly, the present invention relates to a pneumatic logic system for controlling a zero pressure accumulating conveyor and to a pneumatic logic module particularly adapted for use therewith.

The term "zero pressure" as used in the context of accumulating conveyors refers to an accumulating conveyor having controlled spacing between the containers, pallets or other items being conveyed. Controlled spacings prevents contact between the conveyed items which, in turn, minimizes any damage resulting from the conveying process. Controlled spacing is generally achieved by using a conveyor system having a plurality of independently controlled segments. While accumulating conveyors having zero pressure and employing pneumatic control systems are known in the art, there remains a need for improved control systems which can be economically manufactured and installed and which offer flexibility in operation and design.

Wherefore, it is one object of the present invention to provide an improved pneumatic control system for "zero pressure" accumulating conveyors. Another object of this invention is to provide a practical pneumatic control system which can be economically manufactured, installed and operated. Still another object is to provide an improved pneumatic logic module which is inexpensive to manufacture, install and operate and which serves "AND", "RELAY-LIMIT" and "OR" functions. Yet another object of this invention is to provide a pneumatic control system which is flexible in design, and can be adapted for forward or reverse operation, and single or train release of conveyed articles. A further object of this invention is to provide a pneumatic control system which operates with full factory air pressure to perform both logic control and full power actuating functions and hence is immune to the vulnerability of a low pressure system. Yet another object is to provide a control system which can be adapted for use with power valve actuation means for heavy duty conveyors. These and other objects, features and advantages of the present invention will be apparent from the following disclosure taken in conjunction with the drawings attached hereto.

BRIEF DESCRIPTION OF THE DRAWINGS

FIG. 1 is a schematic view of a portion of an accumulating conveyor system suitable for use with the present invention;

FIG. 2 is a front elevational view of a pneumatic logic module of the present invention;

FIG. 3 is a sectional view taken substantially along line 3—3 of FIG. 2, but passing through the entirety of the center of the control valve portion of the module of FIG. 2;

FIG. 4 is a sectional view taken along line 4—4 of FIG. 3;

FIG. 5 is a sectional view taken along line 5—5 of FIG. 3;

FIG. 6 is a sectional view taken along line 6—6 of FIG. 3;

FIG. 7 is a fragmentary schematic illustration of a pneumatic control system embodying the principles of the present invention;

FIG. 8 is a fragmentary schematic illustration of a pneumatic control system showing a modification of the embodiment of FIG. 1 incorporating power valve actuation;

DESCRIPTION OF THE INVENTION

Figure 9:
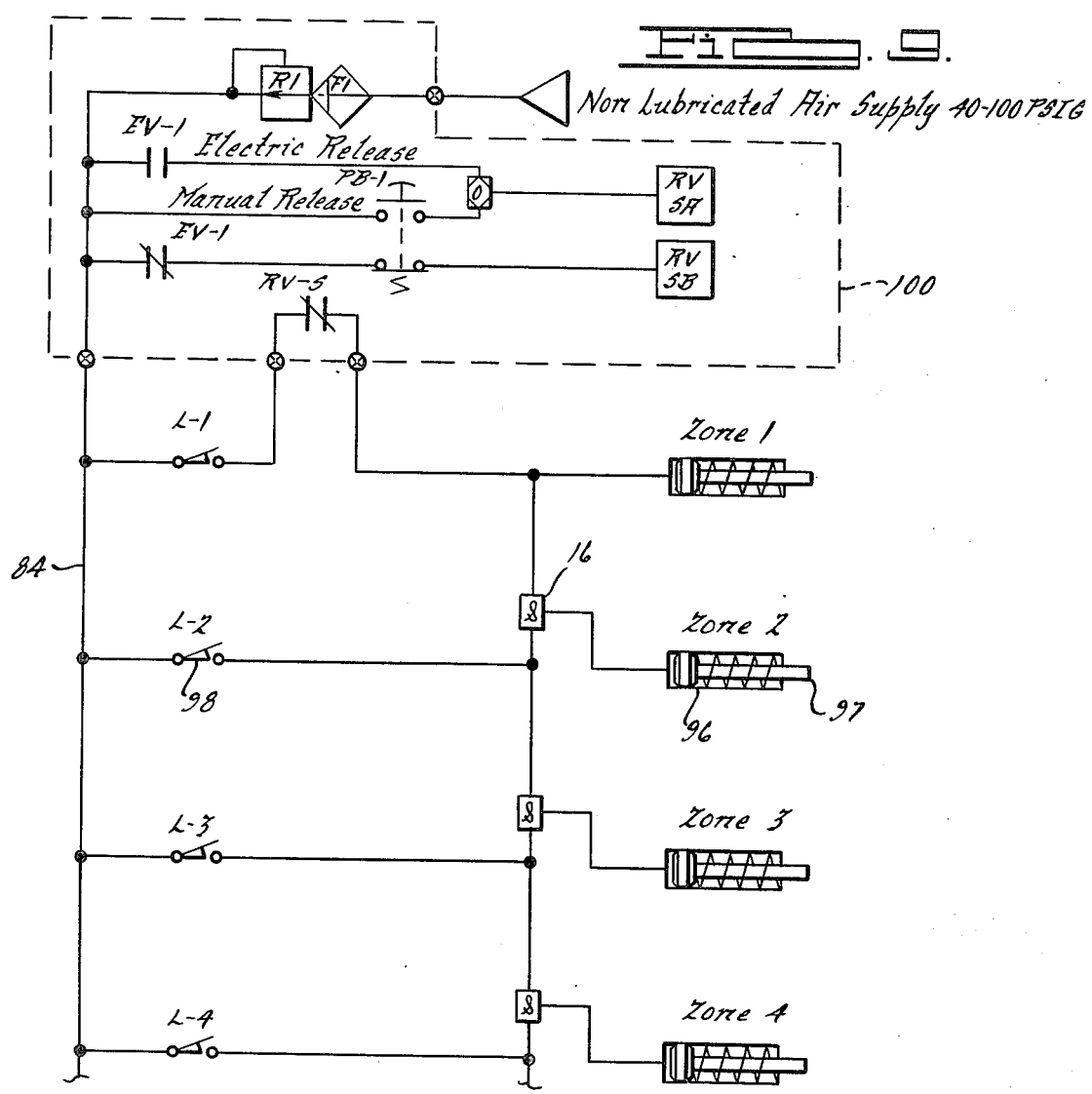
FIG. 9 is a fragmentary schematic illustration of a pneumatic control system illustrating another embodiment of the present invention employing single acting fluid motors.

The present invention relates to a control system for a zero pressure accumulating conveyor and to a pneumatic logic module adapted for use therein. The pneumatic control system of the present invention is intended for use to control a conveyor having a plurality of zones, each zone having an independently controllable drive engaging means. An example of such a conveyor is schematically illustrated in FIG. 1.

Generally speaking, the conveyor of FIG. 1 comprises a plurality of load carrying rollers 1 rotatably mounted between a pair of longitudinally extending channel-shaped side rails 2 in the usual manner. As illustrated schematically in FIG. 1, two of the accumulating zones of the conveyor are indicated at zone 1 and zone 2, the conveyor being arranged for the movement of pallets, packages or other loads to the right as shown. Between the last two rollers 1 of each zone is provided a sensing roller 3 or equivalent device for sensing a package or other conveyed item thereon for controlling the accumulating functions of the conveyor. In the exemplary embodiment shown, most of the load carrying rollers in a given zone are driven by a single V-belt 4, the leading end of which is carried by a pulley 5 and the trailing end of which is powered by a pulley 6. Between pulleys 5 and 6 are idler pulleys 7 and 8 which serve the purpose of holding V-belt 4 in frictional driving engagement with the bottom surface of load carrying rollers 1. The arrangement is such that counterclockwise actuation of pulley 6 causes belt 4 to move in the counterclockwise direction to frictionally drive each of the load carrying rollers 1 engaged thereby in the clockwise direction. Each zone of the conveyor is provided with an independently actuated power module, indicated generally at 9, for powering the pulley 6 controlling that zone by transmitting power from a continuously operated powered chain passing beneath all the zones.

The conveyor of FIG. 1 is similar to the one disclosed in Assignee's copending application, Ser. No. 942,660, filed Sept. 15, 1978, entitled "Accumulating Conveyor", invented by Robert Krammer, which application is a continuation-in-part of Ser. No. 831,756 filed Sept. 9, 1977, now abandoned. It, of course, will be appreciated from the following disclosure that the present invention is not only useful in conjunction with the conveyor system of FIG. 1, but is readily adaptable for use with most accumulating conveyors having zones or segments which have separate drives or drive engaging means for each zone.

Considering first the circuits of the present invention, and with reference to the schematic view of FIG. 7, a control system of the present invention generally comprises a pneumatic logic system having a plurality of zones 11, each of which controls and powers a zone of the conveyor. Thus, each zone 11 controls and/or operates a fluid motor 13, forming a part of a power module 9, which acts to engage or disengage driving power provided by drive chain 10 to or from the load carrying rollers 1 in the corresponding conveyor zone. Each fluid motor 13 is labeled zone 1, zone 2, . . . to indicate the particular conveyor zone controlled thereby, it being understood that the numbers used are arbitrary. Each fluid motor 13 can be any suitable pneumatically powered motor, such as a piston and cylinder motor. For an example of a particularly suitable arrangement see Assignee's aforesaid copending application, the disclosure of which is incorporated herein by reference.

In accordance with this invention, each zone 11 preferably has a pneumatic logic module generally indicated at 15 and enclosed in broken lines. Pneumatic logic module 15 incorporates valve means serving "AND" and "OR" logic functions, as well as a 4-way RELAY-LIMIT valving function. As schematically shown in FIG. 7, each control zone 11 comprises a 4-way limit valve 12, an AND valve 16, and a shuttle valve 18 serving an OR function. The input port of each 4-way limit valve 12 is connected to an air supply line 84, and each 4-way limit valve 12 passes input pressure to one or the other of its output ports, but not simultaneously to both, the output port not being charged being vented to the atmosphere. Each 4-way limit valve 12 has a load-sensing means which determines its valving position. Four-way limit valves 12, indicated at L-1, L-2, . . . , are shown in a "normal" position as would be the case with no load present on the associated conveyor zone. The normally-passing output port of 4-way limit valve 12 is connected to input ports of shuttle valves 18 of the same zone and of the adjacent upstream zone. The normally not passing output port of 4-way limit valve 12 is connected to input ports of AND valves 16 of the same zone and of the adjacent upstream zone. As used herein, the term "upstream zone" refers to the zone of the conveyor earlier traversed by a conveyed load moving in the normal direction. "Downstream zone" refers to the zone later traversed by a conveyed load moving in the normal direction.

The outlet ports of AND valve 16 and shuttle valve 18 are connected to fluid motor 13 to selectively advance and retract same to engage and disengage the transmission of power to the conveyor zone. The output of shuttle valve 18 is employed at the engaging input of fluid motor 13 while the output of AND valve 16 is employed at the disengaging input of fluid motor 13.

Release means, indicated generally at 86 and enclosed in broken lines, is employed in conjunction with the 4-way limit valve L-1 and fluid motor 13 at the discharge end of the conveyor, i.e., zone 1 as shown, in order to manually or electrically control the release of conveyed articles. Release means 86 comprises a conventional pilot operated relay valve RV-S employing an air return and normally in the "B" position, as shown in FIG. 7, in which position an article or load on zone 1 is not released. In addition, release means 86 incorporates a shuttle valve 112 having one input connected to the normally passing output of 4-way limit valve L-1 and another input connected to the normally not passing output of L-1. The output of shuttle valve 112 is connected to the engaging input of fluid motor 13 of zone 1. Pilot port RVSA is connected to parallel manual and electrical release valves PB-1 and EV-1. Pilot port RVSB is connected to the normally passing output of 4-way limit valve L-1, and serves to reset relay valve RVS to the normal "B" position.

In operation, a non-lubricated air supply is filtered at F-1 and regulated by conventional regulator means R-1 and supplied to air supply 84 which provides a source of pneumatic pressure to the inputs of 4-way limit valves L-1, L-2, L-3, . . . , each of which is shown in a normal position, passing pneumatic pressure to shuttle valves 18 of the same zone and the adjacent upstream zone but not passing pneumatic pressure to AND valves 16. As shown, each shuttle valve 18 is passing pneumatic pressure to the engaging input of each fluid motor 13 and the disengaging input of each fluid motor 13 is being vented to the atmosphere by each 4-way limit valve 12 via AND valve 16. Thus, all zones are normally in a driving or an engaged position. To disengage a fluid motor 13 of a particular zone, the 4-way limit valve 12 of the zone and the 4-way limit valve 12 of the adjacent downstream zone must both be in a not-normal or article sensing position indicating that an article is present on the downstream zone and an article is present on the particular zone. Thus, a first article will be conveyed until reaching zone 1 whereupon L-1 will switch from the position shown in FIG. 7 to an article sensing valve position, no longer passing pressure to shuttle 18 or to shuttle 112 shown within release means 86 and now passing pressure through RV-S to the disengaging input of fluid motor 13 of zone 1 and to one input of AND valve 16 of zone 2. Hence fluid motor 13 of zone 1 will move to a disengaged position, it being understood that the pressure in the line connected to the engaging input of fluid motor 13 of zone 1 is vented to the atmosphere through 4-way limit valve 12 via shuttle valve 112. A second article will be conveyed downstream until reaching zone 2 whereupon 4-way limit valve L-2 will switch from the normal position to an article sensing position thereby charging the other input of AND valve 16 of zone 2 as well as an input of AND valve 16 of zone 3 and no longer passing pneumatic pressure to shuttle valves 18 of zone 2 and zone 3. In consequence, AND valve 16 of zone 2 will pass pressure to the disengaging input of fluid motor 13 of zone 2 while pressure is removed from the engaging input of the motor. In like manner, each zone of the conveyor will accumulate conveyed articles without pressure therebetween until each zone has an article thereon.

Removal or release of an article on zone 1 is accomplished manually by physically removing the article or by actuating release means 86 shown schematically within the broken line of FIG. 7. By switching either push-button PB-1 or electric valve EV-1 to a passing condition, pressure is provided to pilot port RVSA which switches relay valve RV-S to a not normal or "A" condition wherein pressure is passed to an input of shuttle valve 112 from air supply 84 and output pressure from L-1 which is in an article sensing position, is interrupted. As a result, pressure to the disengaging input of fluid motor 13 of zone 1 and to one input of AND valve 16 of zone 2 is removed and pressure is provided to the engaging input of fluid motor 13 of zone 1, thus engaging said motor. Once the article is removed from zone 1, L-1 will switch to a normal position and in consequence will charge an input of shuttle 112 to maintain fluid motor 13 of zone 1 in an engaged position while also charging shuttle 18 of zone 2 and removing pressure from AND valve 16 of zone 2 to effect engagement of fluid motor 13 of zone 2. Once an article on zone 2 is removed, L-2 will switch to a normal position and the fluid motor 13 of zone 3 will engage. In this manner the loads of all upstream zones will advance sequentially.

A modification of the embodiment of FIG. 7 is shown in FIG. 8 where the output ports of each AND valve 16 and OR valve 18 are connected to the input ports PV8A indicated at 88, PV8B indicated at 90, PV9A, PV9B, . . . of power valves indicated at PV8, PV9, . . . . Each power valve is connected between supply line 84 and a heavy-duty fluid motor 94 to provide direct actuation of same. In this manner, more air can be applied to actuate fluid motor 94 because it does not have to flow through the logic valves. This embodiment is for conveying particularly heavy loads and, in operation, operates in a manner analagous to the embodiment of FIG. 7 except that engagement and disengagement of heavy-duty fluid motors 94 is effected by the outputs of AND valves 16 and shuttle valves 18 via power valves PV8, PV9, . . . .

Now referring to FIG. 9, a simplified embodiment of the present invention is illustrated wherein single acting fluid motors 96 and 3-way limit valves 98 are employed. Each fluid motor 96 is normally spring biased to a driving position, and when fluid pressure is applied thereto the bias is overcome and the motor is shifted to a not-driving position. It will be appreciated by those skilled in the art that fluid motors 96 are shown in an engaged or driving position or condition when piston 97 is in a leftward position, in contrast to the other disclosed embodiments of this invention where pistons are shown in a rightward position when in an engaged or driving position. Of course, the spring position could be reversed and employed with a normally closed 3-way limit valve. The input of each fluid motor 96 is connected to the output of an AND valve 16 which has one inlet port connected to the output of a 3-way valve 98 for that zone and the other input port connected to the output of the next downstream 3-way limit valve 98. Thus, the output of each 3-way valve 98 is connected, in parallel, to the inputs of two AND valves while the input of each 3-way valve 98 is connected to supply line 84.

The embodiment of FIG. 9 has a release means 100 shown within broken lines which serves, upon command, to interrupt the output of the 3-way valve 98 at L-1. Release means 100 comprises a conventional pilot operated relay valve RV-S with air return and normally in the "B" position. Release means 100 has manual and electrically operated valves PB-1 and EV-1 connected, in parallel, to pilot ports RVSA and RVSB of relay valve RV-S. This embodiment is less expensive than the others, but is slower to operate and is somewhat wasteful of power because of the need to overcome the return spring in each fluid motor.

In operation, in the embodiment of FIG. 9, an article or other load will advance downstream until reaching zone 1 whereupon relay limit valve L-1 will switch to a passing condition which will charge the input of fluid motor 96 of zone 1 and one input of AND valve 16 of zone 2. Fluid motor 96 of zone 1 will shift, in consequence, to a not-driving position. Another load arriving at zone 2 will switch L-2 to a passing condition which will charge the other input of AND valve 16 of zone 2 as well as an input of the AND valve 16 of zone 3. AND valve 16 of zone 2 will then have both inputs charged and will pass pressure to fluid motor 96 of zone 2 which will overcome the spring bias and switch fluid motor 96 of zone 2 to a not-driving condition. In a like manner, the upstream zones of the conveyor associated with the control system of FIG. 9 will sequentially accumulate articles or other loads. When it is desired to release an article from zone 1, release means 100 is activated in the following manner. Either manually operated valve PB-1 or electrically operated valve EV-1 will be switched to provide pneumatic pressure to pilot port RSVA and to remove the charge on pilot port RSSB of relay valve RV-S. Relay valve RV-S will then switch to interrupt the output of 3-way valve L-1 and, in consequence, the pressure at fluid motor 96 of zone 1 and AND valve 16 of zone 2 will be released or vented to the atmosphere. Thus, fluid motors 96 of zone 1 and zone 2 will switch to an engaged or driving position to convey the articles on the associated conveyor zone. Valve L-1 will go to a non-passing condition once the load on zone 1 is released, thereby maintaining fluid motors 96 of zones 1 and 2 in a driving condition. However, when the article on zone 2 arrives at zone 1, valve L-1 will switch to a passing condition to charge fluid motor 96 of zone 1 and AND valve 16 of zone 2 and thereby disengage fluid motor 96 of zone 1. Fluid motor 96 of zone 2 will continue to be engaged until L-2 senses an article thereon and switches to a passing condition whereupon AND valve 16 of zone 2 will have both inputs charged and will provide pressure to fluid motor 96 of zone 2 to effect disengagement thereof.

Figure 10:
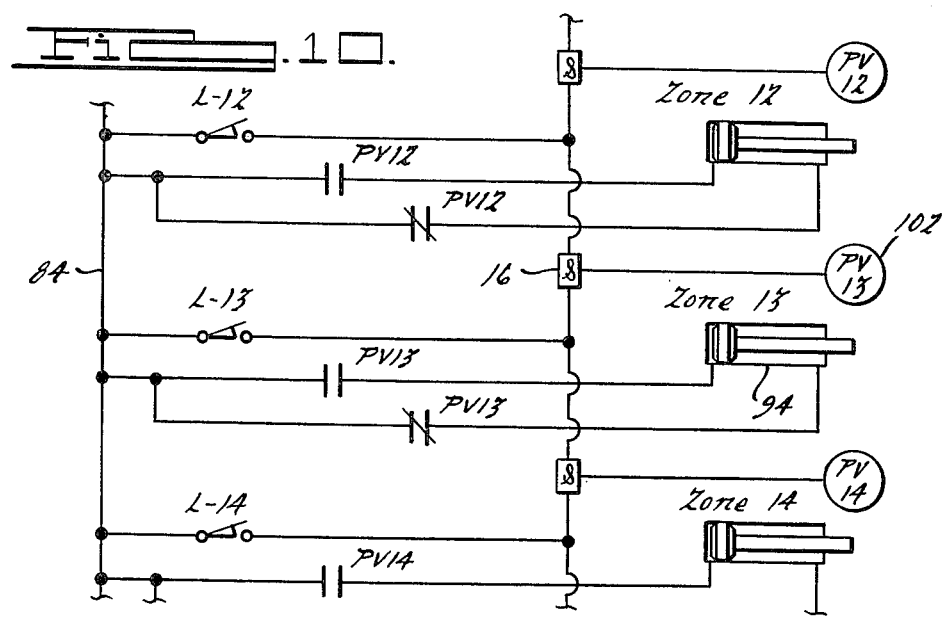
FIG. 10 is a fragmentary schematic illustration of a pneumatic control system illustrating another modification of the embodiment of the present invention incorporating spring return pilot valves for power valve actuation.

FIG. 10 illustrates a modification of the embodiment of FIG. 9, wherein a pilot port of a spring-return power valve PV12, PV13 (as indicated at 102), PV14, . . . is connected to the output from each AND valve 16. Each power valve PV12, PV13, . . . is interposed directly between supply line 84 and a heavy duty fluid motor 94 to actuate same. This embodiment is a heavy-duty version of the embodiment of FIG. 9. The operation of this control system is analogous to that of FIG. 9 except that the output of each AND valve 16 of each zone is employed to switchably operate a spring biased power valve PV12, PV13, PV14 to direct pneumatic pressure from supply line 84 to the engaging or not engaging inputs of a heavy-duty fluid motor 94. As in the embodiment of FIG. 8, in this manner more air can be applied to activate fluid motor 94 because it does not have to go through 3-way valves 98 or AND valves 16.

Figure 11:
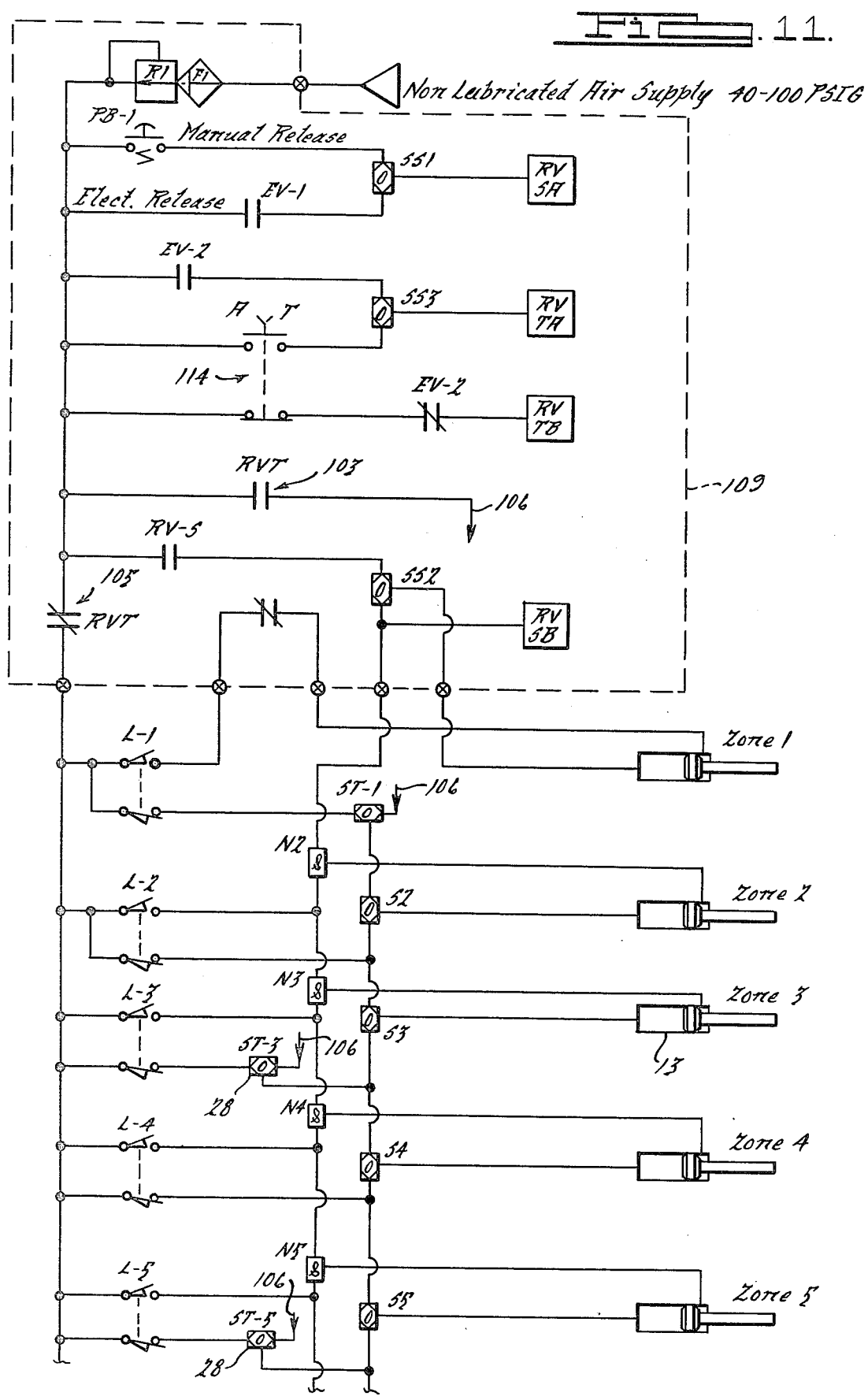
FIG. 11 is a fragmentary schematic illustration of a pneumatic control system showing an embodiment of the present invention adapted for single or train release.

FIG. 11 illustrates an embodiment of the present invention which provides for an optional train release. This embodiment is similar to that of FIG. 7 but has an additional shuttle valve indicated at 28 (similar in construction to shuttle valve 18) associated with each odd numbered zone. As shown, each shuttle valve 28 has one input connected to the normally passing output of the 4-way limit valve 12 of each odd numbered zone. The output of each shuttle valve 28 is connected, in parallel, to inputs of the shuttle valve 18 of the same zone and of the adjacent upstream zone. The other input of each shuttle valve 28 is connected to the output shown at 106 provided by release means 109. Release means 109 comprises the pilot operated relay valve RV-S, with air return and normally in the "B" position previously disclosed in FIG. 7, and in addition has a train release relay valve RV-T with air return and normally in the "B" position. Additional valve means indicated as electric operated valve EV-2 and manually operated valve 114 are connected, in parallel, to pilot ports RVTA and RVTB of train release relay valve RV-T.

In single release mode, the operation of the pneumatic control system shown in FIG. 11 is the same as the embodiment of FIG. 7. In the train release mode, the accumulating logic of the control system is overridden by simultaneous pressure at each input of each shuttle valve 28 which pressure is passed to an input of each shuttle valve 18 and hence to the engaging input of each fluid motor 13 of every zone. Pneumatic pressure is removed from the disengaging input of each fluid motor 13 by interrupting air supply 84 to each 4-way limit valve 12. Thus in the train release mode, pneumatic pressure is applied to the engaging input and removed from the disengaging input of all of the fluid motors 13 to thereby cause all of the fluid motors to simultaneously engage. The train release mode is selected by switching manual valve 114 or electrically operated valve EV-2 to charge pilot port RVTA and vent pilot port RVTB. In consequence, valve RVT switches at 103 to pass pressure to every shuttle valve 28 via line 106 and switches at 105 to interrupt air supply 84.

Figure 12:
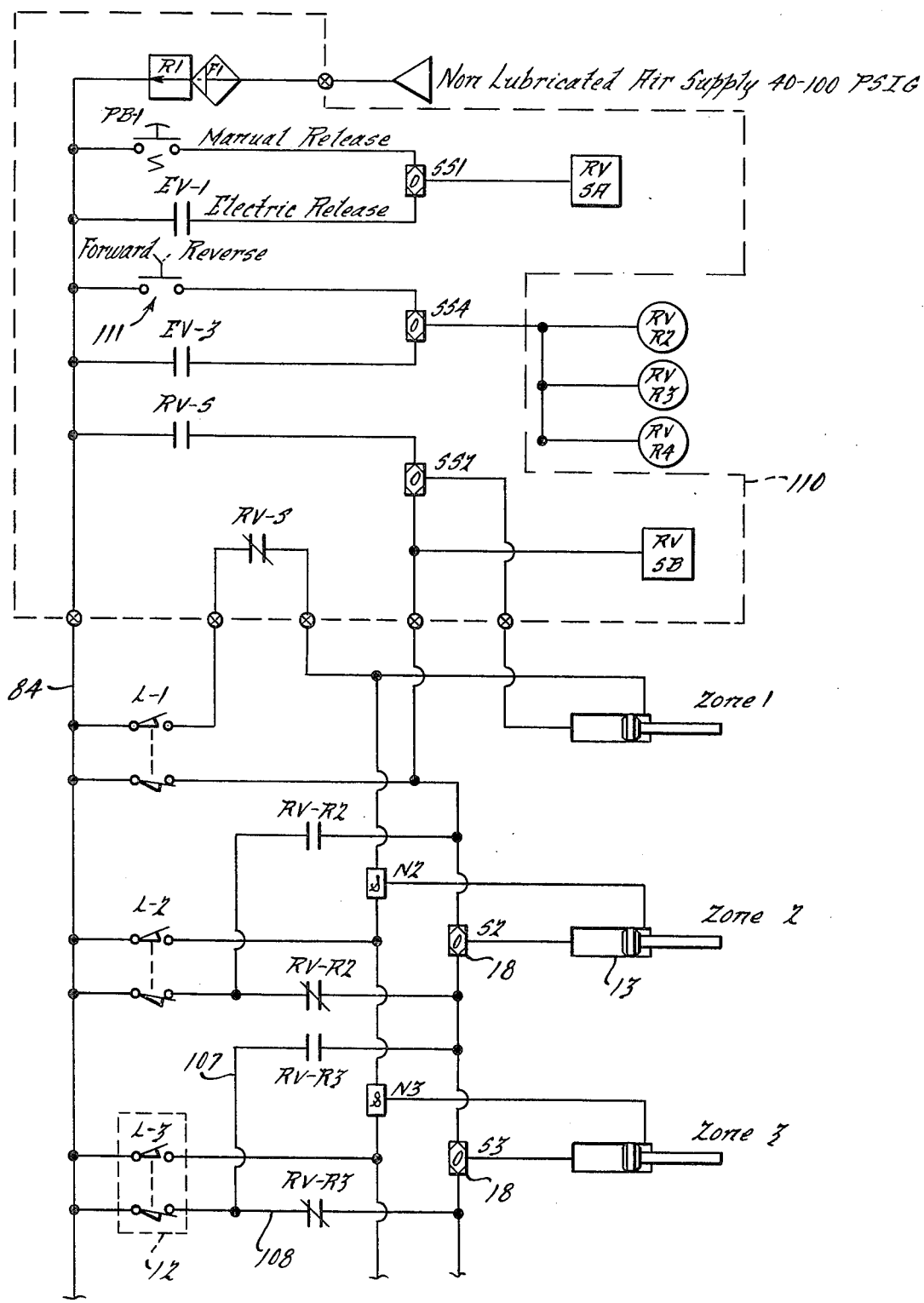
FIG. 12 is a fragmentary schematic illustration of a pneumatic control system showing an embodiment of the present invention adapted for forward or reverse accumulation.

A further embodiment of the invention is shown in FIG. 12 which is similar to the embodiment of FIG. 7 but which provides for zero pressure accumulation when the conveyor is operated in a reverse direction. For this purpose, each zone has an additional air line 107 connecting the normally-passing output of 4-way valve with the inputs of shuttle valve 18 of the same zone and shuttle valve 18 of the adjacent normally downstream zone. A pilot operated relay valve with spring return RVR2, RVR3, . . . is installed in the normally-passing output of each 4-way valve 12 to selectively pass pressure to either additional air line 107 or to line 108 which provides pressure to the inputs of shuttle valve 18 of the same zone and shuttle valve 18 of the adjacent normally upstream zone.

The pilot port of each relay valve RVR2, RVR3, . . . is connected to release means 110 shown enclosed in broken lines in FIG. 12. Release means 110 comprises the pilot operated relay valve RV-S, with air return and normally in the "B" position previously disclosed in the embodiment of FIG. 7. In addition, release means 110 comprises a forward-reverse selector valve means, shown normally not passing and in the forward position having alternate manual and electrically operated valves, at 111 and EV-3 respectively, which when passing charge pilot ports RVR2, RVR3, . . . via shuttle SS4.

The operation of the embodiment of FIG. 12 in the forward, normal direction is the same as that of the embodiment of FIG. 7. However, this embodiment also provides selection means for zero pressure accumulation when the conveyor is run in the reverse direction. To select reverse accumulation it is merely necessary to switch either of manual valve 111 or electrically operated valve EV-3 to a passing condition whereupon pilot ports RVR2, RVR3, RVR4, . . . are charged via shuttle SS4. In response to pressure at each pilot port RVR2, RVR3, RVR4, the spring bias of each valve RVR2, RVR3, RVR4, . . . is overcome and the normally-passing output of each 4-way limit valve L-2, L-3, L-4, . . . will be passed through lines 107 rather than lines 108 and hence will charge the inputs of the shuttle valves 18 of the same zone and each adjacent, normally downstream zone. Of course, it will be appreciated that when operated in the reverse direction the normally downstream zone will be the upstream zone and the accumulating conveyor will operate in an analogous manner to that of FIG. 7 but in a reverse direction. It will also be understood that an additional relay valve RVS must be employed in conjunction with the zone furthest downstream to effect release of an article in that zone in a manner analagous to that of a normal forward operation.

Figure 13:
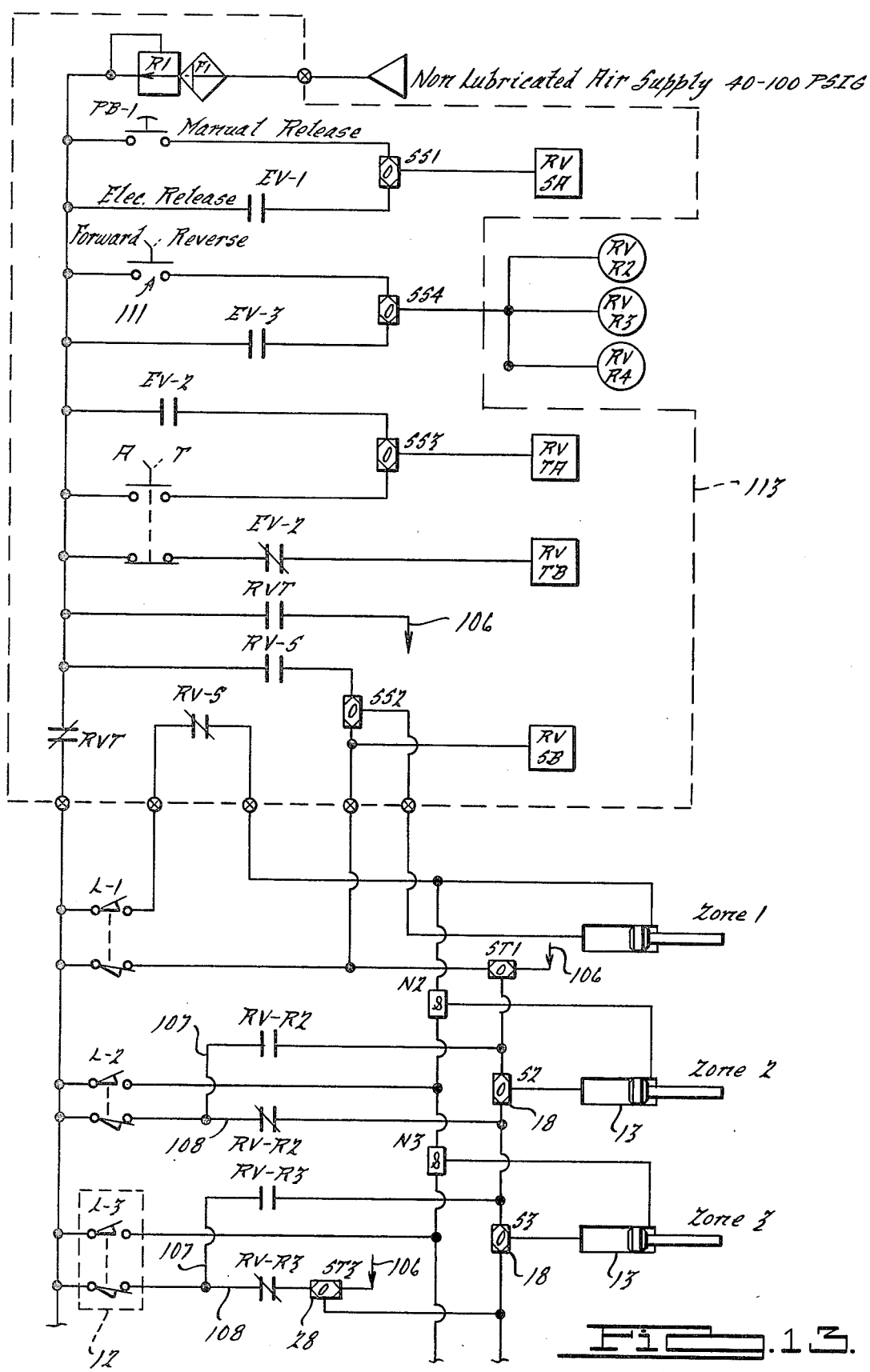
FIG. 13 is a fragmentary schematic illustration of a pneumatic control system showing an embodiment of the present invention adapted for forward or reverse accumulation and single or train release.

Now referring to FIG. 13, another embodiment of the present invention is shown which combines the features of the embodiments of FIGS. 11 and 12. This embodiment provides for forward or reverse accumulation as well as single or train release. Thus, release means 113 comprises the pilot operated relay valve RV-S with air return and normally in the "B" position of the embodiments of FIG. 7, the train release relay valve RV-T with air return and normally in the "B" position of FIG. 11 and the forward-reverse selector valve means normally not passing connected to pilot ports RVR2, RVR3, RVR4, . . . . The operation of this embodiment is single or train release mode is analagous to that of FIG. 11. Also, the operation of this embodiment in forward or reverse accumulating modes is analagous to that of FIG. 12. Each 4-way limit valve 12, AND valve 16, shuttle valve 18, additional shuttle valve 28, fluid motor 13 and relay valve serves the same function as hereinbefore described with respect to the embodiments of FIGS. 11 and 12.

FIGS. 2-6 show a pneumatic logic module 15 of the present invention which, in general, comprises a 4-way limit valve 12, and a logic manifold 14 containing an AND valve 16 and a shuttle valve 18. Pneumatic logic module 15 preferably has an integral housing 17 made of thermoplastic material. 4-way limit valve 12 is a conventional 4-way valve which can be adapted for mechanical switching, as shown in the drawing, or can be modified for electrical switching. 4-way limit valve 12 has an inlet passageway 78 which supplies air pressure to valving chamber 20. Slidably disposed within the interior 25 of 4-way limit valve 12 is an elongated member 26 which has a pair of resilient O-ring seals 27 and 28 which sealingly but slidably engage inward cylindrical surface 29 to define valving chamber 20. Of course, other suitable seals such as thin-lip seals could be used. Elongated member 26 is compressed between springs 30 and 31 and is normally in the position shown in FIG. 3. However, spring 31 has greater resistance to further compression than spring 30 so that downward force against activator 32 will cause downward movement of elongated member 26 until shoulder 33 of elongated member 26 abuts against surface 34. Additional downward movement of activator 32 is taken up by compression of spring 31.

In operation, 4-way limit valve 12 is normally in the position shown in FIG. 3. In this position, air pressure in inlet passageway 78 charges valving chamber 20 with pneumatic pressure which is passed through annular opening 21 to passageway 62. Passageway 42 is vented through annular opening 22 to interior portion 35 and thence through exhaust outlet 24 to exhaust passageway 40. When elongated member 26 is in a switched or downward position, pneumatic pressure in valving chamber 20 is passed through annular opening 22 to passageway 42 and passageway 62 is vented to the atmosphere through annular opening 21 via interior portion 36, exhaust outlet 23, and exhaust passageway 38.

AND valve 16 is disposed within logic manifold 14 and has a first inlet passageway 42 and a second inlet passageway 44. Inlet passageways 42 and 44 each communicate with internal passageway 46 which in turn communicates with outlet passageway 48. Passageway 42 has an outlet, port 80, adapted to provide an output signal for an upstream zone. Similarly, passageway 62 has an outlet, port 82, adapted to provide an output signal for an upstream zone.

Located within AND valve 16 is a floating dumbbell-shaped valving element which has a first spherical member 52 disposed within first inlet passageway 42 and which is connected by stem 54 to a second spherical member 56 disposed within second inlet passageway 44. The diameter of each spherical member 52 and 56 is less than that of inlet passageways 42 and 44 but greater than that of internal passageway 46. First inlet passageway 42 and second inlet passageway 44 have annular shoulders 58 and 60 respectively adapted to sealingly engage spherical members 52 and 56. Stem 54 is of greater axial length than the axial length of internal passageway 46 so that spherical members 52 and 56 can assume a passing position in response to equal inlet pressure wherein neither is in contact with shoulders 58 or 60. Thus, in operation, when unequal pressure is applied to either of inlet passageways 42 or 44, but not both, the spherical member 52 or 56 having the greater pressure thereon will be urged against shoulder 58 or 60 in a sealing relationship and there will be no output through outlet passageway 48. When equal pressure is applied to inlet passageways 42 and 44, spherical members 52 and 56 will be balanced, neither being urged against shoulder 58 or 60 and air will flow through internal passageway 46 and outwardly through outlet passageway 48.

Shuttle valve 18 has a first inlet passageway 62 and a second inlet passageway 64, each communicating with internal passageway 66 within which is disposed a free-floating spherical member 68 which has a diameter greater than that of inlet passageways 62 and 64 but less than that of internal passageway 66. Inlet passageway 62 communicates with additional inlet passageway 82. Outlet passageway 70 communicates with internal passageway 66. Rod 72 and shoulders 74 and 76 retain spherical member within internal passageway 66.

In operation, pressure in either inlet passageway 62 or 64 will urge spherical member 68 away from the pressurized passageway and permit air to pass through internal passageway 66 and outwardly past rod 72 through outlet passageway 70.

In addition to locating AND valve 16 and OR valve 18 logic manifold 14 has a supply way 74 extending transversely therethrough and adapted to be connected at one end to a supply source and at the other end to provide needed supply to another pneumatic valve. An internal feed line 76 communicates with supply way 74 and passageway 78 to provide pneumatic pressure to 4-way limit valve 12. Exhaust ways 38 and 40 communicate exhaust passageways 23 and 24 respectively with the atmosphere.

While several specific embodiments of the present invention have been disclosed herein, it will be appreciated that the invention herein disclosed is subject to variations and alternative embodiments and such variations and alternative embodiments are contemplated to be within the broad scope of this invention which is limited only by the appended claims.

I claim:

1. A control system for an accumulating conveyor having a plurality of load carrying rollers and being divided into a plurality of zones, drive means for driving said rollers, and a fluid motor in each said zone for affecting driving engagement and disengagement of said drive means with and from said rollers in said zone, said system comprising:

a source of fluid under pressure;

a limit valve in each of said zones, each said limit valve having an inlet in fluid communication with said fluid source and being a 4-way valve having actuating means for switching between a first position and a second position, said limit valve having a first outlet and a second outlet, the first outlet communicating with said inlet when said valve is in said first position, the second outlet communicating with said inlet when said valve is in said second position, said actuating means switching said valve to said second position in response to the presence of a conveyed article in the same zone;

an AND valve in each said zone having an outlet port and a pair of inlet ports, said outlet port being in fluid communication with said fluid motor in said zone and said AND valve being operable to place said outlet port in fluid communication with at least one of said inlet ports when actuated in response to fluid pressure at both of said inlet ports, the presence of fluid pressure at only one of said inlet ports being inoperative to actuate said AND valve;

means communicating one of said inlet ports of said AND valve to said second outlet of said limit valve of the same zone and the other of said inlet ports of said AND valve to the second outlet of the limit valve of the adjacent downstream zone; and a shuttle valve in each said zone, said shuttle valve having an outlet and two inlets, one of said inlets of said shuttle valve being in fluid communication with said first outlet of the limit valve of the same zone, the other of said inlets of said shuttle valve being in fluid communication with the first outlet of the limit valve of the adjacent downstream zone, and said outlet of said shuttle valve being responsive to fluid pressure at one of said inlets of said shuttle valve to communicate fluid pressure to said fluid motor in said zone.

2. A control system as claimed in claim 1, wherein said conveyor has a discharge zone at the extreme downstream end thereof and said control system further comprises a release means connected to the fluid motor in said discharge zone for causing engagement of said drive means in response to a manual input.

3. A control system as claimed in claim 2, wherein said release means comprises a pilot operated relay valve having a first input connected in fluid communication with the second outlet of the limit valve in said discharge zone, a second input connected in fluid communication with the first outlet of the limit valve in said discharge zone, a first output connected to a disengaging input of the fluid motor of said discharge zone and a second output connected to an engaging input of said fluid motor of said discharge zone.

4. A control system as claimed in claim 1, wherein said actuation of said AND valve places said outlet port in fluid communication with both of said inlet ports.

5. A control system as claimed in claim 1, wherein the fluid pressure at each of said inlet ports must be substantially equal for actuation of said AND valve to occur.

6. A control system as claimed in claim 1, wherein said AND valve has:
   a dumbbell-shaped valving element having a pair of spherical members connected by a stem, each of said spherical members being disposed in one of said inlets of said AND valve, and
   an internal passageway communicating with each of said pairs of inlets and said outlet port of said AND valve;
   said internal passageway being of a smaller diameter than either of said spherical members and having an axial length less than the axial length of said stem.

7. A control system as claimed in claim 1 wherein said fluid motor disengages said drive means from said zone in response to fluid pressure from said AND valve in said zone.

8. A control system as claimed in claim 7 wherein said AND valve actuates said fluid motor directly.

9. A control system as claimed in claim 7 further comprising a power valve between said AND valve outlet port and said fluid motor.

* * * * *